(No Model.)

G. S. HUNTER & J. SHEERER.
AUTOMATIC BRAKE FOR VEHICLES.

No. 425,075. Patented Apr. 8, 1890.

Witnesses
John Enders Jr.
H. E. Peck.

Inventor
George S. Hunter,
Jacob Sheerer.
By his Attorney
J. E. Duff

UNITED STATES PATENT OFFICE.

GEORGE S. HUNTER, OF BLACK HAWK, AND JACOB SHEERER, OF BEAVER FALLS, PENNSYLVANIA.

AUTOMATIC BRAKE FOR VEHICLES.

SPECIFICATION forming part of Letters Patent No. 425,075, dated April 8, 1890.

Application filed August 6, 1889. Serial No. 319,887. (No model.)

*To all whom it may concern:*

Be it known that we, GEORGE S. HUNTER, of Black Hawk, and JACOB SHEERER, of Beaver Falls, in the county of Beaver and State of Pennsylvania, have invented certain new and useful Improvements in Automatic Brakes for Vehicles; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to an improvement in automatic brakes for vehicles wherein the brakes are applied to the wheels when backward strain is exerted on the holdback-strap, as when a vehicle is going downhill.

The object of the invention is to provide an improved automatic brake for vehicles, preferably light-weight vehicles—such as buggies, &c.—exceedingly cheap, simple, and durable in construction, sure and effective in operation, and so constructed that when the vehicle to which it is attached is going downhill the brake will be automatically applied and thereby assist the horse, and which is so constructed that when the vehicle is being backed the brake will not be applied. These objects are accomplished by and our invention consists in certain novel features of construction and combinations of parts more fully described hereinafter, and particularly pointed out in the claims.

Figure 1:
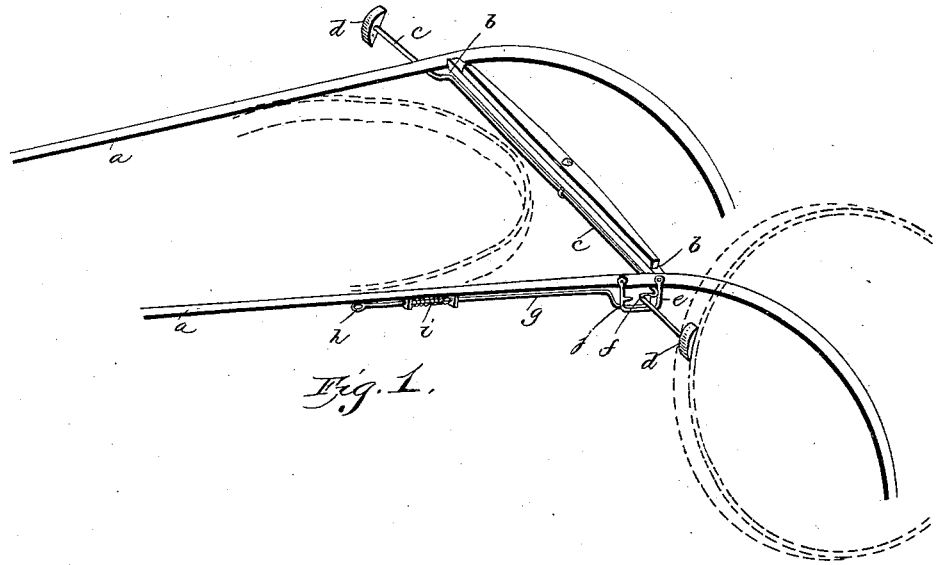
Figure 2:
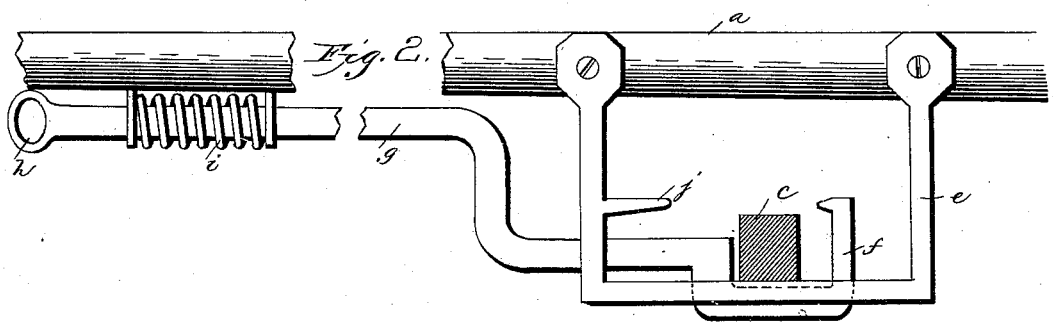

Referring to the accompanying drawings, Figure 1 is a perspective view of the shafts of a vehicle with the improved brake attached, dotted lines showing the position of a wheel and of the holdback-strap. Fig. 2 is a side elevation of a shaft, the brake-bar being shown in section.

In the drawings, the reference-letter $a$ indicates the shaft of a vehicle, and $b$ indicates the cross-bar of the same, to which the singletree is pivoted. A pair of brake-bars $c\ c$ are pivoted or hinged at their inner ends to the cross-bar $b$, preferably by means of the singletree pivot-bolt, and these brake-bars extend laterally beyond the shafts, so that their free ends are located opposite the peripheries of the front wheels and are provided with brake-shoes $d$, preferably composed of blocks formed of rubber or like elastic material. Open brackets or frames $e\ e$ are correspondingly and longitudinally located upon the shafts, said brackets being suitably secured to and extending below the shafts and supporting the brake-bars which pass through the brackets and loosely rest in hooks $f\ f$, each located beside a frame $e$ and open at the top and carried by longitudinally-movable rods $g\ g$, which extend forwardly along the shafts, and at their front ends are provided with loops $h\ h$, or other means by which the front ends of the holding-back strap can be secured to the rods. These rods are secured to the shaft by suitable eyes or brackets, and the hooks $f\ f$ are yieldingly held to the limit of their movement at the front ends of the frames $e\ e$ by means of coil-springs $i\ i$, embracing the rods and located between brackets. When the parts are in their normal positions, the hooks are located at the front ends of the supporting-frames and their open tops are located between the horizontal projections $j\ j$, which prevent the bars from rattling and hold them to their seats in the hooks.

The operation of the device is obvious. When going downhill or when backward pull is exerted on the holdback-strap, it will be seen that the operating-rods and their hooks will be carried back, and with them the brake-rods, forcing the brake-blocks against the wheels and greatly assisting the animal. When the pull on the holdback-strap ceases, the spring immediately returns the parts to their normal positions. When the vehicle is being backed, of course the backward pressure on the holdback-strap will throw the brakes against the wheels, and the reverse motion of the wheels will lift the brake-bars upwardly from the hooks in which they loosely rest.

The utility and advantages of this device are obvious.

What we claim is—

1. In a vehicle-brake, the combination of the pivoted brake-bars carrying brake-shoes, open inclosing-brackets depending from the shafts and through which said bars extend, and the spring operating-rods longitudinally confined on the shaft and having recesses or hooks open at the top at their rear ends and in which said bars rest, substantially as described.

2. In a vehicle-brake, the combination of movable brake-bars having brake-shoes to engage the peripheries of the wheels, open brackets secured to the shafts and through which the bars extend, longitudinally-movable bars carried by the shafts and provided with hooks at their rear ends open at the top and in which said bars rest, projections of the frame closing said open tops when the hooks are in their normal position, and springs yieldingly holding said bars in their normal position, substantially as described.

In testimony that we claim the foregoing as our own we affix our signatures in presence of two witnesses.

GEO. S. HUNTER.
    JACOB SHEERER.

Witnesses:
 R. D. HUNTER,
 I. W. SHEERER.